(12) United States Patent
Fin

(10) Patent No.: US 6,430,872 B1
(45) Date of Patent: Aug. 13, 2002

(54) POSITION AND SPEED DETERMINATION FOR MOVING GLASS PANEL

(75) Inventor: Enrico Fin, Lake Orion, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/635,601

(22) Filed: Aug. 9, 2000

(51) Int. Cl.⁷ .................................................. E05F 15/08
(52) U.S. Cl. .................................................. 49/349; 49/360
(58) Field of Search .................. 49/348, 349, 360, 49/502, 26, 27, 28

(56) References Cited

U.S. PATENT DOCUMENTS

| | | | |
|---|---|---|---|
| 3,602,786 A | * 8/1971 | Izhelya | 318/243 |
| 4,918,835 A | * 4/1990 | Weislo et al. | 29/732 |
| 5,196,745 A | * 3/1993 | Trumper | 310/12 |
| 5,302,884 A | * 4/1994 | Fischperer et al. | 318/135 |
| 5,309,677 A | * 5/1994 | Kunert et al. | 49/349 |
| 5,734,727 A | 3/1998 | Flaherty | |
| 6,106,582 A | * 8/2000 | Heyder et al. | 29/25.01 |

FOREIGN PATENT DOCUMENTS

| | | | |
|---|---|---|---|
| DE | 195 40 769 C1 | 11/1996 | |
| DE | 196 50 446 A1 | 7/1997 | |
| FR | 2710366 | * 3/1995 | 49/360 |
| JP | 03086623 | 4/1991 | |
| JP | 06171367 | 6/1994 | |
| JP | 2000130021 | 5/2000 | |
| JP | 2000142392 | 5/2000 | |

OTHER PUBLICATIONS

International Search Report, Dec. 13, 2001.

* cited by examiner

Primary Examiner—Jerry Redman
(74) Attorney, Agent, or Firm—Carlson, Gaskey & Olds

(57) ABSTRACT

A control utilizes a unique linear motor for a vehicle closure system that has a plurality of rungs crossing between side pieces. The rungs are made to provide an individual signal to a sensor such that the sensor can identify the location of the closure as it passes the rungs. In one example the distance between adjacent rungs is varied such that each of the distances are unique. In this way, the control can identify the actual location of the closure by identifying the particular signal. In other embodiments the rungs are made to each be individual in some fashion. As an example, the size of each rung can be varied.

7 Claims, 1 Drawing Sheet

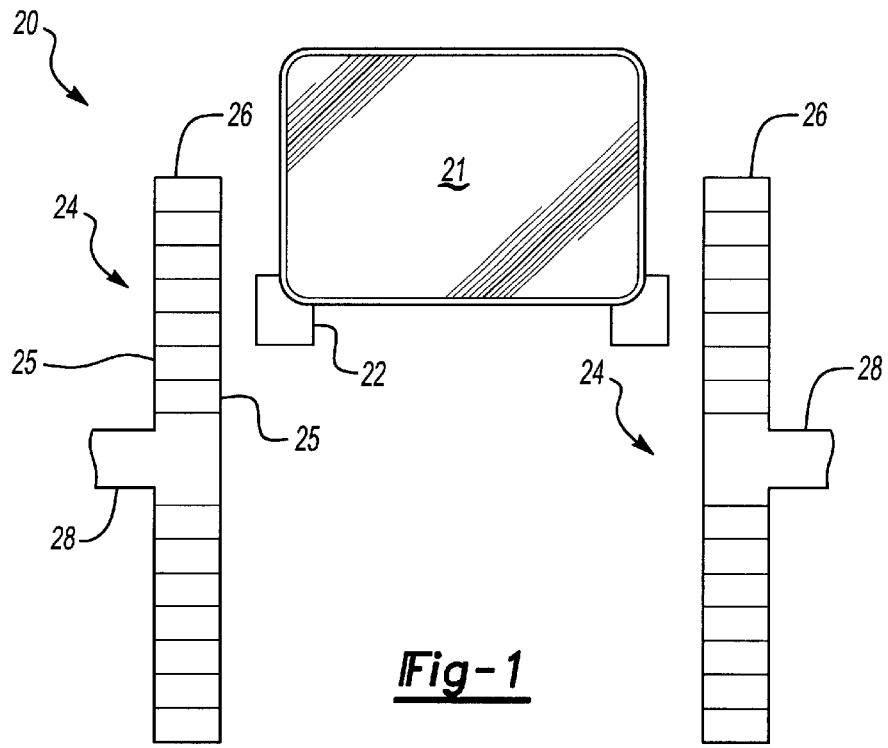
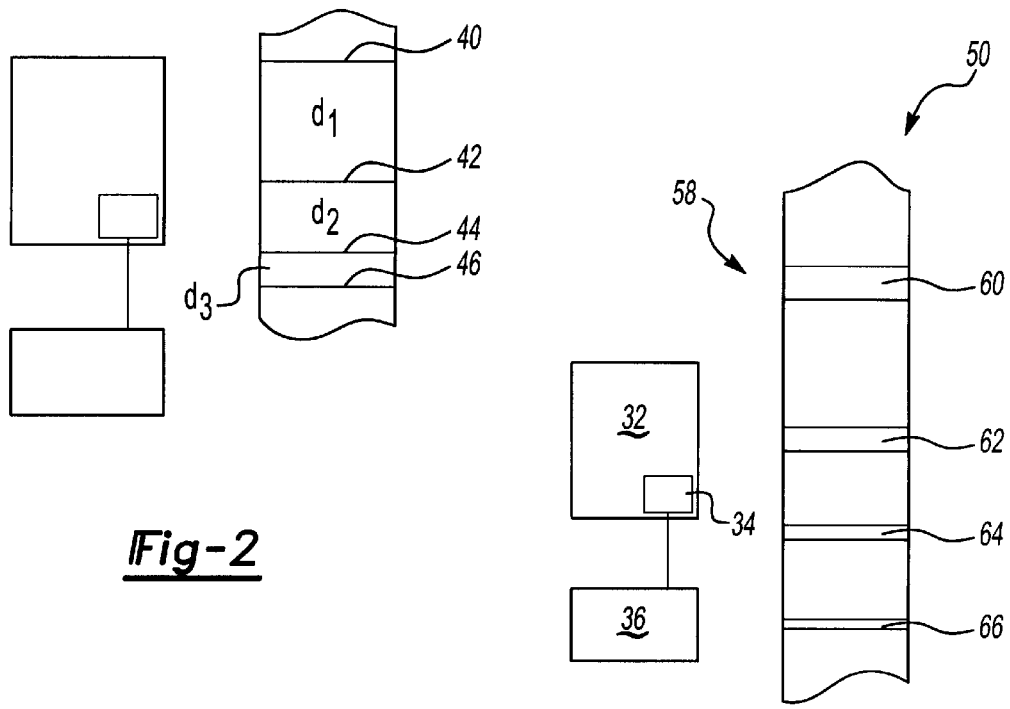

POSITION AND SPEED DETERMINATION FOR MOVING GLASS PANEL

BACKGROUND OF THE INVENTION

This invention relates to a simple and precise way of identifying position and/or speed of a moving panel, such as a vehicle closure.

Vehicles are provided with moving closures such as windows, sunroofs, moonroofs, etc. In the prior art, these devices are typically powered by an electric motor driving the closure through some form of mechanical connection. One concern with such connections is that the closures are typically powered to close upon the actuation of a switch. Thus, an operator of a vehicle may actuate a switch to instruct the closure to move to a fully closed position. In those conditions, it is desirable to know the position of the moving panel at all times during the closing maneuver, for example in order to recognize the normal approach of end of travel as opposed to the presence of an obstacle in the path.

More recently, the inventor of the present application has invented a unique linear motor drive for a vehicle closure. This invention is disclosed in co-pending patent application Ser. No. 09/498,401 filed Feb. 4, 2000, and entitled "Integral Linear Motor". This invention includes a moving magnet that moves with the closure and an electric linear stator formed by a plurality of rungs arranged in a ladder-like fashion. The type of motor disclosed in the above-referenced application may be modified to provide position and/or speed feedback.

SUMMARY OF THE INVENTION

In a disclosed embodiment of this invention, the stator for a linear motor for driving a vehicle closure is arranged in such a fashion that the rungs are distinct. In this way, a control can identify the particular position of the closure, and/or can also determine velocity information. From the velocity and position information the control can also assist an appropriate detection device in identifying the presence of an obstruction.

In one embodiment, the distance between the rungs is modified such that the distance between each pair of rungs is individually different. In this way, the control can sense the distance between two adjacent rungs, and know precisely where the closure is in its path of movement. This can also be utilized to determine velocity of the moving closure. Once velocity is known, an obstruction can also be identified through an appropriate detection device. In this way, an obstruction can be predicted early in the path of the closure, and before the closure begins to pinch the obstruction. Notably, the obstruction is the most typically a passenger's body part, and thus it is desirable to identify the obstruction as early as possible.

In other embodiments, the shape of wires at any one of the rungs can be modified such that each rung can be individually identified.

These and other features of the present invention can be best understood from the following specification and drawings, the following of which is a brief description.

BRIEF DESCRIPTION OF THE DRAWINGS

FIG. 1 is a schematic view of the basic linear motor for driving a closure.

FIG. 2 shows a first embodiment of this invention.

FIG. 3 shows a second embodiment.

DETAILED DESCRIPTION OF A PREFERRED EMBODIMENT

A vehicle closure system 20 is illustrated in FIG. 1 having a moving closure 21 driven to move by a pair of movable magnets 22. The magnets are movable along a pair of linear motor stators 24. As can be seen, the stators have a pair of side pieces 25, and a plurality of rungs 26 crossing between the side pieces 25. Current is provided through the connections 28, and a linear motor is thus created. This basic structure is disclosed in the above-referenced U.S. patent application Ser. No. 09/498,401. As can be appreciated, when an operator requests the closure 21 to move to an open or closed position, current is actuated and the magnets 22 are driven for movement. In this way, the closure 21 also moves.

FIG. 2 shows an arrangement 30 wherein the moving magnet 32 also carries a sensor 34. The sensor 34 communicates with the control 36. In a preferred embodiment, the sensor 34 may be a Hall-effect sensor. The stator 38 has a plurality of rungs, here shown as 40, 42, 44 and 46. As shown there are unique distances $d_1$, $d_2$, $d_3$, between each adjacent pair of rungs, 40, 42, 44, and 46. The amount of distance between the distances $d_1$–$d_3$ is exaggerated to illustrate the fact of the differences. As the magnet 32 moves along the stator 38 the magnet interacts with each rung 40, 42, 44, and 46. Notably, in an actual embodiment there will be many more rungs. The interaction of the magnets and the rungs creates a magnetic effect that can be sensed by the sensor 34. Again the sensor 34 may be a Hall-effect sensor. Each individual distance $d_1$, $d_2$, and $d_3$ is distinct. The sensor can determine what distance is between each of the rungs, and thus know precisely what position the magnet is at during the course of travel of the closure 21. Moreover, as the magnet moves through each distance, and by identifying the time it passes each of the rungs, the control 36 can also identify the velocity.

FIG. 3 shows another embodiment 50 having a stator 58 for driving the magnet 32 with its sensor 34 and control 36. The rungs 60, 62, 64 and 66 are shown to be different in that they each have an individual size which will vary the signal. Again, the illustrated differences are exaggerated. The sensor 34 is able to identify which particular rung is being passed. The control will again be able to identify the exact location of the closure by looking at this unique signal.

The control will store a plurality of expected signals for each of the rungs (FIG. 3), or for each of the distances (FIG. 2). The sensed distance or width can then be compared to expected distances or widths such that the control can identify which rung is associated with any one sensed signal. In this way, the control can identify the location of the closure.

In sum, the present invention utilizes the unique motor structure of the previously filed patent application, and modifies the stator such that precise feedback on position and/or speed is provided. This will also allow the prediction of an obstruction.

Although preferred embodiments have been disclosed, a worker in this art will recognize that several modifications will come within the scope of this invention. For that reason, the following claims should be studied to determine the true scope and content of this invention.

What is claimed is:

1. A system for driving a vehicle closure comprising:

a closure movable between open and closed positions;

a motor for driving said closure, said motor including at least one magnet moving with said closure;

said motor further including at least one linear stator, said linear stator having a plurality of spaced members, and said members being unique such that a sensor associated with said moving magnet can identify which member is being passed by sensing a signal, and comparing it to a number of possible signals; and a control for identifying a position of said closure based upon said comparison of said sensed signal, and said possible signals.

2. A system as set forth in claim 1, wherein said members are a plurality of rungs extending between laterally spaced side members.

3. A system as set forth in claim 2, wherein adjacent ones of said rungs are spaced by unique distances such that said sensor can determine the distance between two rungs and thus identify the location of said closure.

4. A system as set forth in claim 2, wherein the individual rungs are made to be distinct.

5. A system as set forth in claim 4, wherein the width of wires associated with said rung is varied.

6. A system as set forth in claim 1, wherein said sensor is a Hall-effect sensor.

7. A system as set forth in claim 1, wherein said control can predict an obstruction based upon a velocity determined from said position information.

\* \* \* \* \*

UNITED STATES PATENT AND TRADEMARK OFFICE
CERTIFICATE OF CORRECTION

PATENT NO.    : 6,430,872 B1                                          Page 1 of 1
DATED         : August 13, 2002
INVENTOR(S)   : Fin It is certified that error appears in the above-identified patent and that said Letters Patent is hereby corrected as shown below:

<u>Column 2,</u>
Line 65, delete "a" and replace it with -- said --

<u>Column 3,</u>
Line 7, delete "for"

<u>Column 4,</u>
Line 12, delete "position information" and replace it with -- control --

Signed and Sealed this

Twenty-sixth Day of November, 2002

Attest:

Attesting Officer

JAMES E. ROGAN
Director of the United States Patent and Trademark Office